(12) United States Patent
Ezequiel

(10) Patent No.: US 9,538,347 B2
(45) Date of Patent: Jan. 3, 2017

(54) INFORMATION DISTRIBUTION SYSTEM, AND METHOD THEREOF

(75) Inventor: Ruiz Rodriguez Ezequiel, Panama (PA)

(73) Assignee: NAXOS FINANCE SA, Luxembourg (LU)

( * ) Notice: Subject to any disclaimer, the term of this patent is extended or adjusted under 35 U.S.C. 154(b) by 100 days.

(21) Appl. No.: 14/130,516

(22) PCT Filed: Jul. 4, 2011

(86) PCT No.: PCT/EP2011/061199
§ 371 (c)(1),
(2), (4) Date: Jan. 31, 2014

(87) PCT Pub. No.: WO2013/004287
PCT Pub. Date: Jan. 10, 2013

(65) Prior Publication Data
US 2014/0134985 A1    May 15, 2014

(51) Int. Cl.
*H04M 3/42* (2006.01)
*H04W 4/18* (2009.01)
(Continued)

(52) U.S. Cl.
CPC .............. *H04W 4/18* (2013.01); *G06F 9/4448* (2013.01); *G06Q 10/10* (2013.01);
(Continued)

(58) Field of Classification Search
CPC .......... H04W 8/18; H04W 8/26; H04W 76/02; H04W 88/02; H04W 8/205; H04W 4/001; H04W 8/04; H04W 8/06; H04W 8/12; H04W 8/183; H04W 36/14; H04W 36/0022; H04W 88/06; H04W 36/0033; H04W 36/0083; H04W 36/0055; H04W 8/08; H04W 92/14; H04W 12/06; H04W 28/18; H04W 40/04; H04W 64/00; H04W 72/04; H04W 84/12; H04W 52/244; H04M 15/83; H04M 15/88; H04M 17/10; H04M 2215/0116; H04M 2215/2026; H04M 3/51; H04M 3/4931; H04M 2201/40; H04M 15/90; H04M 3/42229; H04M 3/523; H04M 3/527; H04M 2017/12; H04M 2201/38; H04M 2203/2061; H04M 1/72519; H04M 3/5175; H04M 3/5233; H04Q 3/0029
(Continued)

(56) References Cited

U.S. PATENT DOCUMENTS 5,479,494 A * 12/1995 Clitherow ............. H04M 17/02
                                                      379/114.15
5,940,493 A *  8/1999 Desai ................... H04M 3/4931
                                                      379/223
(Continued)

FOREIGN PATENT DOCUMENTS

CN     101262358      9/2008
CN     101527738      9/2009
(Continued)

OTHER PUBLICATIONS

Korean Office Action for Application No. 10-2013-7034883 dated Apr. 20, 2015.
(Continued)

*Primary Examiner* — Nimesh Patel
(74) *Attorney, Agent, or Firm* — Frommer Lawrence & Haug LLP

(57) ABSTRACT

An information distribution system, of the type including distribution means adapted to distribute said information in a first predefined language, said distribution means including at least one distribution device coupled to at least one control unit. The invention is characterized in that said (Continued)

system includes connection means for establishing a telephone connection with a mobile telephone through a telephone network, said connection means being associated with said distribution means for distributing said information through said at least one device in a second language corresponding to the language of the country where a SIM card has been associated with said mobile telephone that has established said telephone connection.

20 Claims, 3 Drawing Sheets

(51) Int. Cl.
*G06F 9/44* (2006.01)
*G06Q 10/10* (2012.01)
*H04W 4/00* (2009.01)
*H04M 1/725* (2006.01)
*H04L 29/08* (2006.01)

(52) U.S. Cl.
CPC ........ *H04L 67/2823* (2013.01); *H04L 67/306* (2013.01); *H04M 1/72563* (2013.01); *H04W 4/003* (2013.01)

(58) Field of Classification Search
USPC ...................................................... 455/414.1
See application file for complete search history.

(56) References Cited

U.S. PATENT DOCUMENTS

| | | | | | |
|---|---|---|---|---|---|
| 6,052,461 | A | * | 4/2000 | Lam | H04M 3/2272 379/201.01 |
| 6,069,939 | A | * | 5/2000 | Fung | H04M 3/4228 379/67.1 |
| 2002/0006787 | A1 | * | 1/2002 | Darby | G06Q 10/02 455/419 |
| 2002/0007418 | A1 | * | 1/2002 | Hegde | H04L 67/04 709/231 |
| 2002/0111155 | A1 | | 8/2002 | Ando | |
| 2004/0242188 | A1 | * | 12/2004 | Uchida | H04M 3/4874 455/403 |
| 2009/0227207 | A1 | * | 9/2009 | Rouffet | G06Q 10/02 455/41.2 |
| 2011/0246178 | A1 | * | 10/2011 | Arzelier | H04M 1/72552 704/8 |

FOREIGN PATENT DOCUMENTS

| | | |
|---|---|---|
| EP | 1 231 798 | 8/2002 |
| EP | 1 453 340 | 9/2004 |
| EP | 1 524 870 | 4/2005 |
| JP | 2000-322126 | 11/2000 |
| JP | 2002-32652 | 1/2002 |
| JP | 2003-134257 | 5/2003 |
| JP | 2005-198003 | 7/2005 |
| JP | 2011-515901 | 5/2011 |
| KR | 10-2010-0123877 | 11/2010 |
| WO | WO 2009/106527 | 9/2009 |
| WO | WO 2010/142357 | 12/2010 |

OTHER PUBLICATIONS

JP Office Action for Application No. 2014-515007 dated Nov. 25, 2014.

International Search Report for Application No. PCT/EP2011/061199 dated Mar. 28, 2012.

Notification of First Office Action for Chinese Application No. 201180072059.6 dated Dec. 22, 2015.

* cited by examiner

INFORMATION DISTRIBUTION SYSTEM, AND METHOD THEREOF

The present application claims priority from PCT Patent Application No. PCT/EP2011/061199 filed on Jul. 4, 2011, the disclosure of which is incorporated herein by reference in its entirety.

FIELD OF THE INVENTION

The present invention relates to an information distribution system of the type including distribution means adapted to distribute said information in a first predefined language, said distribution means including at least one distribution device coupled to at least one control unit. Also, the present invention relates to an associated method for distributing information.

It is noted that citation or identification of any document in this application is not an admission that such document is available as prior art to the present invention.

It is known in the art to use an information distribution system, in particular of the type comprising at least one information distribution device and a control unit coupled to said device in order to allow for the distribution of information.

In particular, said distribution device may comprise at least one display for distributing information visually and/or at least one loudspeaker for distributing information audibly; the systems known in the art often comprise a plurality of displays and a plurality of loudspeakers, thus accomplishing both visual and audible information distribution.

Such information distribution systems are commonly used in airports, railway stations, museums and the like; in particular, said information may relate to timetables of arrival and departure of means of transportation, information about train arrival or departure platforms, place of arrival or departure of an airplane, information about a certain product in a shopping centre or about a certain work of art in a museum, and the like.

The data relating to the information to be distributed is typically stored in a memory of the control unit coupled to the information distribution device, said data being selectable in accordance with different selection criteria.

For example, one criterion may be a specific time range on a specific date; in such a case, the information to be distributed may relate to all means of transportation (airplanes, trains and the like) arriving at and/or departing from a certain place (airport, train station and the like) within that specific time range on that specific date.

Another criterion may relate to the characteristics and price of a certain product, in particular within a shopping centre environment.

Said information is generally distributed in a predefined and preset language, which is normally the language of the country where the information distribution system is located.

Furthermore, when the information is provided in visual form, it may be distributed in different languages on a plurality of displays, so that the same information can be distributed in a first language (e.g. English) on a first display, in a second language (e.g. French) on a second display, in a third language (e.g. German) on a third display, and so on; when the information is also provided in audible form, it may be distributed alternately in the various languages.

However, it has been observed that the systems known in the art suffer from some drawbacks, in that the costs to be incurred in to systematically multiply the number of languages in which the information is distributed are particularly high.

In addition, it has been observed that the systematic repetition of the same audible or visual information in different languages is often annoying.

Furthermore, it must be noted that the most important drawback of the systems known in the art is that the information is not distributed in a manner such that it is adequate for and usable by all potential users.

In fact, with reference to the above examples, some users speak no English, French or German, and consequently cannot understand the information being distributed in such languages.

It is also apparent that it is absolutely disadvantageous to multiply the visual distribution devices (e.g. displays) and the audible distribution devices (e.g. loudspeakers) in order to be able to distribute information in all the existing languages; as a consequence, the known information distribution systems cannot make the information accessible to all potential users without necessarily using excessively costly and/or virtually unfeasible solutions.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

In this frame, it is the main object of the present invention to provide an information distribution system, and a method thereof, conceived in a manner such as to overcome the drawbacks of prior-art solutions.

In particular, it is one object of the present invention to provide an information distribution system, and a method thereof, which allow said information to be distributed in a manner such that it is adequate for and usable by all potential users.

It is another object of the present invention to provide an information distribution system, and a method thereof, which are so designed as to require no excessively costly and virtually unfeasible solutions.

Said objects are achieved by the present invention through an information distribution system, and a method thereof, incorporating the features set out in the appended claims, which are intended as an integral part of the present description.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
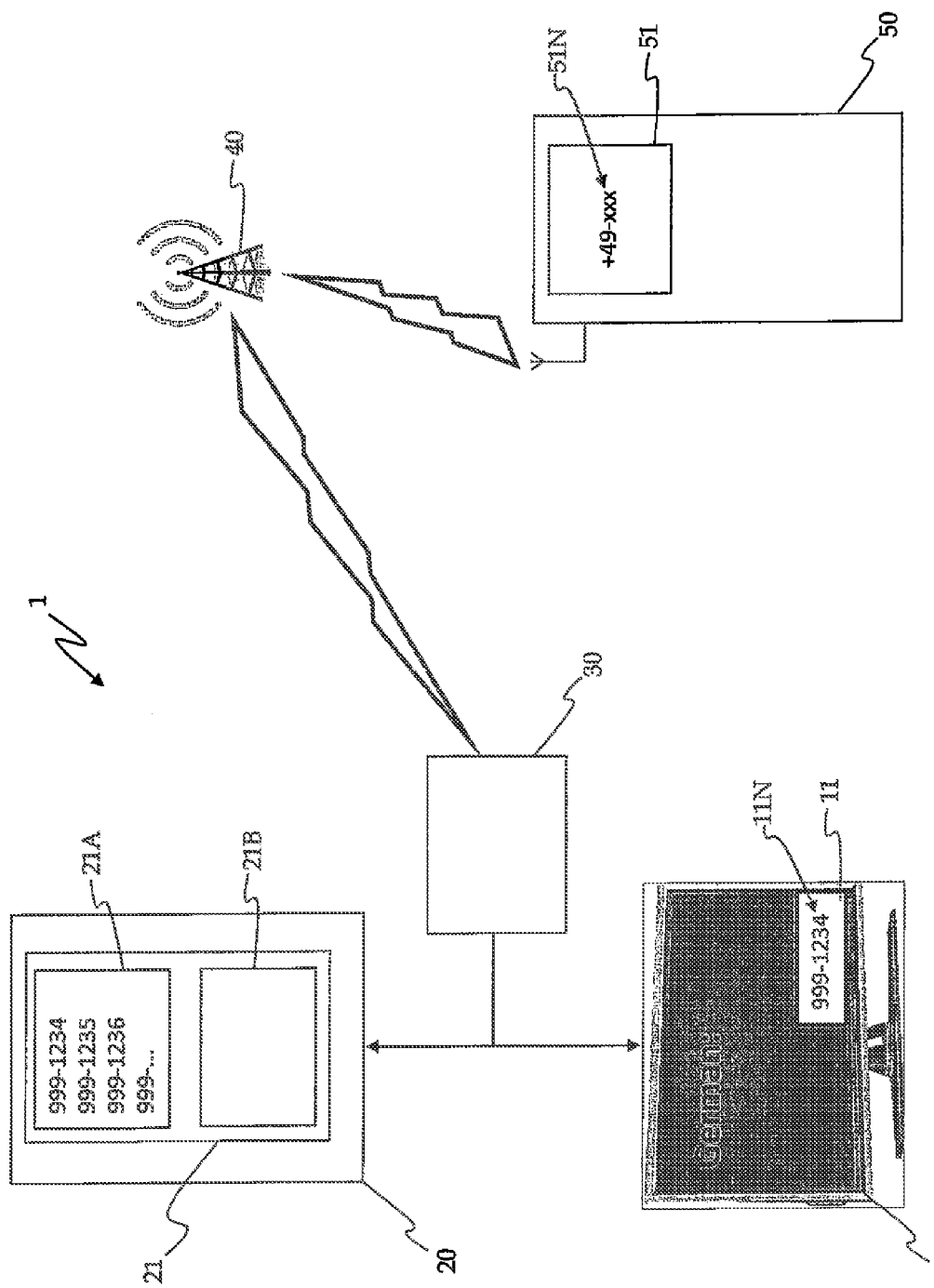
FIG. 1 is a schematic view of an information distribution system according to the present invention.

Referring now to the annexed drawings, in FIG. 1 reference numeral 1 designates as a whole an information distribution system according to the present invention.

In particular, the system 1 according to the present invention comprises distribution means 10, 20 suitable for distributing said information in a first predefined language, said distribution means comprising at least one distribution device 10 coupled to at least one control unit 20.

Usually said first predefined language is the language of the country where the system 1 is located or installed.

In the representation of FIG. 1, said at least one device 10 is a display for distributing information visually; nevertheless, said at least one device 10 may also comprise at least one loudspeaker for distributing information audibly. It is clear that, in accordance with the present invention, said loudspeaker may be used as an alternative or in addition to a display.

Preferably, the system 1 according to the present invention comprises a plurality of devices 10, in particular a plurality of displays and/or loudspeakers (not shown in the annexed drawings).

The connection between said at least one device 10 and said at least one control unit 20 may be either a wired one, e.g. using wires or cables, or a wireless one, e.g. using WI-FI, Bluetooth or infrared transmission or a similar connection.

Preferably, said control unit 20, which uses one or more microprocessors, comprises at least one memory 21 in which the information to be distributed through said at least one device 10 is stored as data; as a result, said control unit 20 is suitable for sending the information stored as data in the memory 21 to said at least one device 10, so that said at least one device 10 can then distribute said information.

For example, said control unit 20 may be a computer, in particular an electronic one, equipped with a hard disk for storing in the form of data the information to be distributed.

In accordance with the present invention, the system 1 comprises connection means 30 for establishing a telephone connection with a mobile telephone 50 through a telephone network 40, said connection means 30 being associated with said distribution means 10, 20 for distributing said information through said at least one device 10 in a second language corresponding to the language of the country where a SIM card 51 has been associated with said mobile telephone 50.

Furthermore, according to the present invention, said at least one device 10 comprises a visible portion 11 displaying a telephone number 11N associated with said at least one device 10. By way of example, in FIG. 1 said telephone number 11N is number 999-1234.

It is clear that, according to the present invention, said connection means 30 may comprise a telephone apparatus of any generation (e.g.: GSM, 3G, LTE, and the like).

Preferably, the system 1 comprises a plurality of devices 10, each device 10 comprising a visible portion 11 displaying a telephone number 11N which is different from a telephone number 11N of the other devices 10.

This allows the user to obtain information of interest from a certain device 10 only, without the system 1 according to the present invention having to change the language of all other devices 10.

In particular, the telephone numbers 11N of each device 10 of said plurality of devices 10 may be obtained by associating a wholly different number with each device 10. This association between the telephone numbers to be called and the plurality of devices 10 is stored in the memory 21, preferably in table form.

As an alternative, said telephone numbers 11N may be obtained by associating with each device 10 a number consisting of a common main part followed by extension numbers that select the different devices 10; by way of example, FIG. 1 shows one possible embodiment of this alternative, wherein the telephone numbers 11N of said plurality of devices 10 correspond to the numbers 999-1234, 999-1235, 999-1236, 999- . . . .

In a preferred embodiment, said connection means 30, in particular comprising a telephone apparatus, are associated with the control unit 20, said control unit 20 being in its turn associated with said plurality of devices 10. This reduces the cost and complexity of the devices 10, since it is not necessary to include a telephone apparatus into each device 10.

In this embodiment, the memory 21 of the control unit 20 comprises:
- a first section 21A storing the telephone numbers 11N of each device 10,
- a second section 21B storing, in different languages, the information to be distributed through at least one device 10 of said plurality of devices 10, and the control unit 20 controls the device 10 associated with a respective telephone number 11N in a manner such that the information is distributed in said second language (corresponding to the language of the country where a SIM card 51 has been associated with said mobile telephone 50).

It is however clear that the system 1 according to the present invention may also be configured in a manner such that said connection means 30, in particular comprising a telephone apparatus, are associated with each device 10 of a plurality of devices 10.

In order to cause the information to be shown in said second language on a particular device 10, a user will have to dial on his/her mobile telephone 50 the telephone number 11N displayed on a visible portion 11 of that particular device 10 located within the visual or audible range of the user.

After that, the connection means 30 will receive the call through the telephone network 40, and the control unit 20 will deduce the calling user's nationality based on the SIM card 51 contained in the mobile telephone 50 and will change the first language of the (graphic or vocal) information presented by that particular device 10 associated with the called telephone number into the second language corresponding to the nationality of the SIM card 51.

In the exemplifying case shown in FIG. 1, the user dials the telephone number 11N displayed on the device 10 (i.e. number 999-4234), so that the connection means 30 receive the call through the telephone network 40 and the control unit 20 can deduce the user's nationality and the device 10 it refers to. Since the SIM card 51 has a number 51N that begins with +49 (said number being shown in FIG. 1 as +49 xxx), the control unit 20 changes the first language of the information presented by the device 10 into that second language (German, as shown in FIG. 1) which corresponds to the nationality of the SIM card 51.

In fact, the caller's nationality can be inferred from the number of the SIM card 51. For example, a telephone number beginning with number +49 indicates that the SIM card 51 belongs to an operator and a caller from Germany (as shown in the example of FIG. 1); a telephone number beginning with number +44 indicates that the SIM card 51 belongs to an operator and a caller from the United Kingdom; a telephone number beginning with number +39 indicates that the SIM card 51 belongs to an operator and a caller from Italy, and so on.

It is clear that said telephone connection between the system 1 and the mobile telephone 50 may require the making of a telephone call or the sending of a short text message (Short Message Service, or "SMS") from the mobile telephone 50 to the telephone number 11N displayed in the visible portion 11 of the device 10.

In this latter case, the connection means 30 and the control unit 20 will read the SMS message and will then change the language of the (graphic or vocal) information distributed by the device 10 identified by the SMS message accordingly. In particular, said change of language may be made on the basis of the recognition of the number of the SIM card 51 that has sent the SMS message and/or of the text of the SMS message.

Consequently, it is apparent that the system 1 according to the present invention allows distributing information which is adequate and usable by all potential users; in fact, after establishing a telephone connection (consisting of either a telephone call or an SMS message) between the mobile telephone 50 and the system 1, the first language of the (graphic or vocal) information normally presented by the selected device 10 is changed into a second language corresponding to the nationality of the SIM card 51.

The fact that the language of the information is changed from a first language of normal operation of the device 10 into a second language corresponding to the nationality of the SIM card 51 allows to provide an information distribution system 1 which is so designed as to require no excessively costly or virtually unfeasible solutions.

As a matter of fact, the particular design of the system 1 according to the present invention allows to avoid a multiplication of the devices 10 which would otherwise be necessary according to the prior art in order to try to distribute the information in substantially all of the existing languages.

If said multiplication were accomplished by distributing the information in sequence in the various existing languages, it would be annoying and time-consuming, since the user would have to wait for the information to be presented in his/her language by the device 10.

If said multiplication were accomplished by providing a specific device 10 for each existing language, it would turn out to be excessively costly or even not feasible at all.

Moreover, the system 1 according to the present invention allows distributing information to a plurality of users of different nationalities without requiring any changes to the mobile terminal 50; as a consequence, every user can receive the information in his/her own language, without incurring in additional costs for purchasing or modifying his/her own mobile terminal 50.

Figure 2:
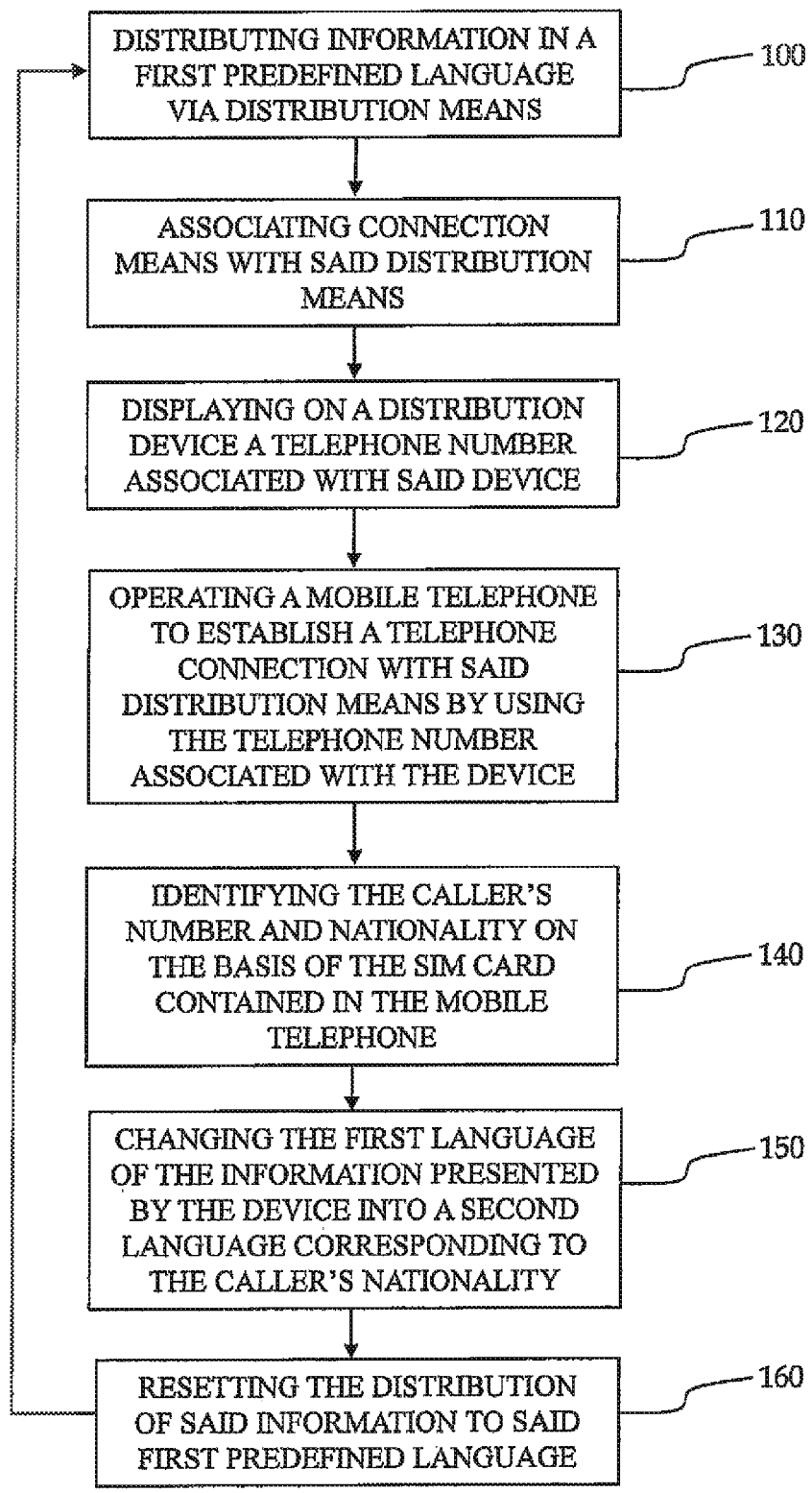
FIG. 2 is a flow chart relating to a first embodiment of an information distribution system according to the present invention.
Figure 3:
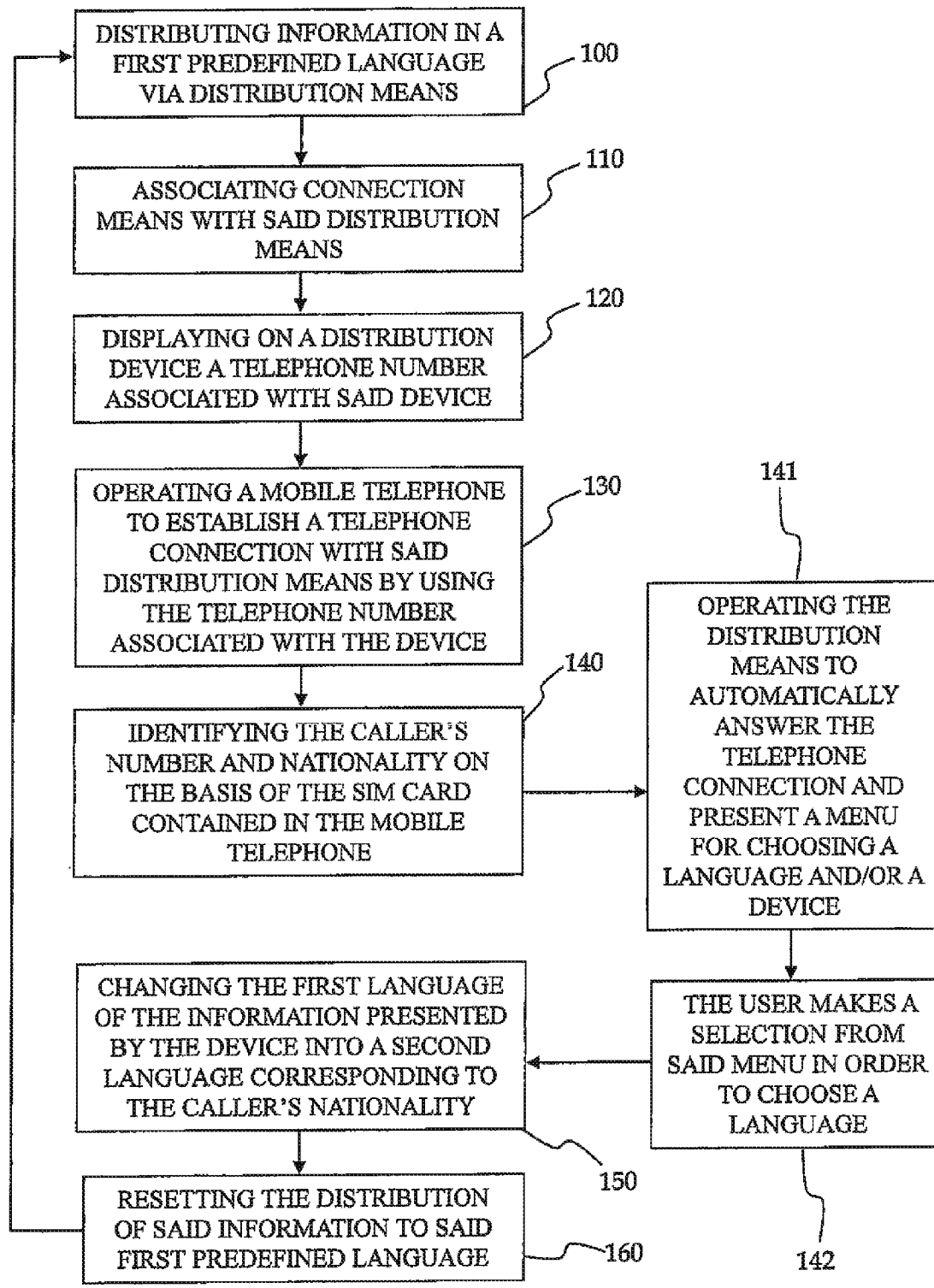
FIG. 3 is a flow chart relating to a second embodiment of an information distribution system according to the present invention.

The annexed FIGS. 2 and 3 show a method for distributing information through a system 1 comprising distribution means 10, 20 adapted to carry out a step 100) consisting of distributing said information in a first predefined language, said distribution means comprising at least one device 10 coupled to at least one control unit 20.

FIG. 2 shows that, in accordance with the present invention, said method comprises the following steps:
- 110) associating connection means 30 with said distribution means 10, 20;
- 120) associating a telephone number 11N with said at least one device 10, in particular with a visible portion 11 of said at least one device 10;
- 130) operating a mobile telephone 50 to establish a telephone connection with said distribution means 10, 20 through a telephone network 40, said telephone connection being made by using the telephone number 11N associated with said at least one device 10;
- 140) identifying, by said distribution means 10, 20, the caller's number and nationality on the basis of the data contained in a SIM card 51 contained in the mobile telephone 50, in particular on the basis of the telephone number contained in said SIM card 51;
- 150) changing the first language of the (graphic and/or vocal) information presented by said at least one device 10 into a second language corresponding to the caller's nationality.

Preferably, the method according to the present invention further comprises a step 160) of resetting the distribution of said information to said predefined language after a predetermined time period.

In particular, step 160) may be carried out in a manner such that said predetermined time period substantially corresponds to the duration of said telephone connection. This prevents the device 10 from distributing information for too long time in a second language understood by the user of the mobile telephone 50 but very often not understood by the local public.

Preferably, said step 110) is implemented by associating said connection means 30, in particular comprising a telephone apparatus, with a control unit 20; in a preferred embodiment, said step 110) is further implemented by associating said control unit 20 with a plurality of devices 10.

As an alternative, said step 110) is implemented by associating the connection means 30, in particular comprising a telephone apparatus, with each device 10 of a plurality of devices 10.

Furthermore, said step 120) of associating a telephone number 11N with said at least one device 10 may be implemented by associating a wholly different number with each device 10 of a plurality of devices 10; as an alternative, said step 120) may be implemented by associating a common number with all the devices 10 of a plurality of devices 10, and by associating an extension number that selects each device 10 of said plurality of devices 10.

The step 130) of establishing a telephone connection between the system 1 and the mobile telephone 50 may then involve making a call or sending an SMS message from the mobile telephone 50.

FIG. 3 shows a second embodiment of the method for distributing information according to the present invention.

As can be seen in this figure, said step 140) of identifying the caller's number and nationality on the basis of the data contained in the SIM card 51 is followed by a step 141), wherein the distribution means 10, 20 are operated in a manner such that the telephone connection is answered automatically and a menu is presented for choosing the language and/or the device 10 that must distribute the information.

In this embodiment, said step 141) is followed by a step 142), wherein the user makes a selection from said menu in order to choose a language and/or a device 10.

This selection may be made by the user (i.e. the person using the mobile telephone 50) according to different modes; for example, it may be made by pressing a key (not shown in the drawings) of the mobile telephone 50, said key corresponding to the information distribution language chosen among the multiple options presented by the distribution means 10, 20 through said menu. In addition, said key (or another key not shown in the drawings) may be used for selecting the device 10 that must distribute the information.

After carrying out the step 142), the system 1 carries out the step 150) according to the present invention, i.e. the step of modifying the first language of the (graphic and/or vocal) information presented by said at least one device 10 into a second language corresponding to the caller's nationality.

The second embodiment shown in FIG. 3 turns out to be particularly useful when the user lives in a multi-language country. For example, let us consider the case of Switzerland, where the official languages are German, French and Italian; in this case the user is given the possibility of making a selection from a menu presented by the distribution means 10, 20 in order to choose that language which he/she uses most and understands best.

It is however clear that said second embodiment may also be used in the case of a user not living in a multi-language country; in fact, it may be used for choosing the device 10 that must distribute the information, e.g. by selecting, from the menu presented by the distribution means 10, 20, the extension number that selects a particular device 10.

The advantages of an information distribution system 1, and a method thereof, according to the present invention are apparent from the above description.

In particular, such advantages consist of the fact that the system 1 and the method according to the present invention allow for the distribution of information which is adequate for and usable by all potential users. In fact, it is sufficient to establish a telephone connection (by making a telephone call or sending an SMS message) between the mobile telephone 50 and the system 1 to change the first language of the (graphic and/or vocal) information normally presented by the device 10 into a second language corresponding to the nationality of the SIM card 51.

A further advantage of the system 1 and of the method according to the present invention is that they make it unnecessary to use any excessively costly and virtually unfeasible solutions; as a matter of fact, the particular realization of the system 1 and of the method according to the present invention prevent having to distribute information in substantially all existing languages through a costly and useless multiplication of the devices 10.

A further advantage of the system 1 according to the present invention is that it can be used without requiring any modifications to the mobile terminal 50; as a consequence, each user can receive the information in his/her own language without incurring in additional costs for purchasing or modifying his/her own mobile terminal 50.

The system and the method described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described system and method, but may be subject to many modifications, improvements or replacements of equivalent parts and elements without departing from the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A visual information distribution system comprising:
   a visual distribution means adapted to distribute visual information in a first predefined language, said visual distribution means comprising:
      at least one display coupled to at least one control unit; and
   a connection means configured to establish a telephone connection through a telephone network between the visual information distribution system and a mobile telephone that has a subscriber identification module ("SIM") card and is calling the visual information distribution system;
   wherein said connection means is associated with said visual distribution means so as to, upon establishing the telephone connection, distribute said visual information through said at least one display in a second language corresponding to a language of a country associated to the SIM card of said mobile telephone;
   wherein said visual distribution means is configured to, upon answering of the telephone connection by the visual information distribution system, automatically present a menu for choosing a third language, different from both the first language and the second language, in which said visual information is to be displayed.

2. The system according to claim 1;
   wherein said at least one display comprises a visible portion displaying a telephone number associated with said at least one display.

3. The system according to claim 1, further comprising:
   a plurality of displays, including the at least one display, each display of the plurality of displays comprising a visible portion displaying a telephone number which is different from a telephone number of each of the other displays of the plurality of displays.

4. The system according to claim 3;
   wherein said telephone numbers of each display of said plurality of displays are obtained by associating a different identification number with each display.

5. The system according to claim 3;
   wherein said telephone numbers of each display of said plurality of displays are obtained by associating with each display an identification number comprising a common main party followed by extension numbers that select the different displays.

6. The system according to claim 3;
wherein the system comprises at least one memory storing, in the form of data, the visual information to be distributed through said at least one display.

7. The system according to claim 6;
wherein said at least one memory comprises:
   a first section storing the telephone numbers of each display;
   a second section storing, in different languages, the visual information to be distributed through at least one display of said plurality of displays; and
   wherein the control unit controls the display associated with a respective telephone number so as to distribute the visual information in said second language.

8. The system according to claim 1;
wherein said connection means are associated with the control unit, said control unit being in its turn associated with said plurality of display devices.

9. The system according to claim 1;
wherein said connection means are associated with each display of a plurality of displays.

10. A method for distributing visual information through a system comprising visual distribution means adapted to carry out a step comprising distributing said visual information in a first predefined language, said visual distribution means comprising at least one display coupled to at least one control unit, said method comprising the following steps:
   a connection-means-associating step comprising associating connection means with said visual distribution means;
   a telephone-number-associating step comprising associating a telephone number with said at least one display;
   a telephone-connection step comprising establishing a telephone connection between a mobile telephone, which is calling the visual distribution means, and said visual distribution means through a telephone network, said telephone connection being made by using the telephone number associated with said at least one display;
   a nationality-identifying step comprising identifying, by said visual distribution means, a caller's number and nationality on the basis of the data contained in a subscriber identification module ("SIM") card contained in the mobile telephone;
   a display-language-changing step comprising changing the first language of the visual information presented by said at least one display into a second language corresponding to the nationality identified in the nationality-identifying step; and
   a menu-presentation step comprising automatically answering the telephone connection by the visual distribution means and presenting a menu for choosing a third language different from both the first language and the second language.

11. The method according to claim 10, further comprising the following step:
   a resetting step comprising resetting the distribution of said visual information to said predefined language after a predetermined time period.

12. The method according to claim 11;
wherein said resetting step is carried out in a manner such that said predetermined time period substantially corresponds to the duration of said telephone connection.

13. The method according to claim 10;
wherein said connection-means-associating step is carried out by associating said connection means with a control unit of said visual distribution means.

14. The method according to claim 13;
wherein said connection-means-associating step is carried out by associating said control unit with each display of a plurality of displays.

15. The method according to claim 13;
wherein said connection-means-associating step is carried out by associating said connection means with each display of a plurality of displays.

16. The method according to claim 10;
wherein said telephone-number-associating step is carried out by associating a different identification number with each display of a plurality of displays.

17. The method according to claim 10;
wherein said telephone-number-associating step is carried out by associating a common identification number with all the displays of a plurality of displays, and by associating an extension number that selects each display of said plurality of displays.

18. The method according to claim 10;
wherein the telephone-connection step of establishing a telephone connection between the system and the mobile telephone comprises receiving a telephone call made by the mobile telephone.

19. The method according to claim 10;
wherein the telephone-connection step of establishing a telephone connection between the system and the mobile telephone comprises receiving a text message sent by the mobile telephone.

20. The method according to claim 10, further comprising:
   a further display-language-changing step comprising changing the second language to the third language upon selection of the third language by a user.

* * * * *